(12) United States Patent
Zotov et al.

(10) Patent No.: US 10,502,568 B2
(45) Date of Patent: Dec. 10, 2019

(54) INERTIAL SENSING SYSTEMS AND METHODS OF MANUFACTURING THE SAME

(71) Applicant: General Electric Company, Schenectady, NY (US)

(72) Inventors: Sergey Alexandrovich Zotov, Glenville, NY (US); Christopher Fred Keimel, Niskayuna, NY (US); Todd Frederick Miller, Mechanicville, NY (US); Yizhen Lin, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 14/931,939

(22) Filed: Nov. 4, 2015

(65) Prior Publication Data

US 2017/0067742 A1  Mar. 9, 2017

Related U.S. Application Data

(60) Provisional application No. 62/154,384, filed on Apr. 29, 2015.

(51) Int. Cl.
*G01C 19/5684* (2012.01)
*G01P 15/02* (2013.01)
*G01P 15/08* (2006.01)

(52) U.S. Cl.
CPC .......... *G01C 19/5684* (2013.01); *G01P 15/02* (2013.01); *G01P 2015/0805* (2013.01)

(58) Field of Classification Search
CPC ............ G01C 19/5621; G01C 19/5656; G01C 19/5684; G01C 19/5712; G01C 19/5719; G01C 19/5726; G01C 19/5733; G01C 19/574; G01C 19/5747; G01C 19/5762; G01C 19/5776; G01C 25/00; G01C 25/005; G01P 15/02; G01P 2015/0808;
(Continued)

(56) References Cited

U.S. PATENT DOCUMENTS 5,450,751 A  9/1995  Putty et al.
6,481,285 B1  11/2002  Shkel et al.
(Continued)

FOREIGN PATENT DOCUMENTS

EP   2669629 A1   11/2010
WO   2004015372 A1   2/2004
WO   2011026100 A1   3/2011

OTHER PUBLICATIONS

"IEEE Standard Specification Format Guide and Test Procedure for Coriolis Vibratory Gyros", IEEE Std 1431-2004, pp. 1-78, IEEE, Dec. 20, 2004.
(Continued)

*Primary Examiner* — Jonathan M Dunlap
*Assistant Examiner* — Irving A Campbell
(74) *Attorney, Agent, or Firm* — Armstrong Teasdale LLP

(57) ABSTRACT

A gyroscope includes at least one anchor and a plurality of gyroscope spring elements coupled to the at least one anchor. The gyroscope also includes a plurality of concentric rings coupled to the plurality of gyroscope spring elements and configured to encircle the plurality of gyroscope spring elements. The gyroscope further includes an excitation/detection/tuning unit electrostatically coupled to the plurality of concentric rings.

8 Claims, 3 Drawing Sheets

(58) Field of Classification Search
CPC ....... G01P 2015/0814; G01P 2015/082; G01P 2015/0805
USPC ........... 73/1.37, 1.38, 1.77, 146.5, 493, 497, 73/504.02, 504.03, 504.04, 504.13, 73/504.14, 510, 511, 514.15, 514.16, 73/514.29, 514.32, 514.36, 514.38, 700, 73/716, 717, 718, 724, 777, 778, 861.52
See application file for complete search history.

(56) References Cited

U.S. PATENT DOCUMENTS

| | | | |
|---|---|---|---|
| 6,584,845 B1* | 7/2003 | Gutierrez | G01C 19/56 73/504.04 |
| 7,040,163 B2 | 5/2006 | Shcheglov et al. | |
| 7,493,814 B2 | 2/2009 | Whelan et al. | |
| 7,513,156 B2 | 4/2009 | Chikovani et al. | |
| 7,581,443 B2 | 9/2009 | Kubena et al. | |
| 7,637,157 B2 | 12/2009 | Chikovani et al. | |
| 8,011,246 B2 | 9/2011 | Stewart | |
| 8,205,495 B2 | 6/2012 | Challoner | |
| 8,333,112 B2 | 12/2012 | Schwartz et al. | |
| 8,342,023 B2 | 1/2013 | Geiger | |
| 8,448,513 B2 | 5/2013 | Lin | |
| 8,567,247 B2 | 10/2013 | Shkel et al. | |
| 2008/0295622 A1 | 12/2008 | Challoner | |
| 2010/0281977 A1* | 11/2010 | Coronato | G01C 19/5712 73/504.14 |
| 2013/0160578 A1 | 6/2013 | Najafi et al. | |
| 2014/0013845 A1 | 1/2014 | Stewart et al. | |
| 2016/0123735 A1* | 5/2016 | Gregory | G01C 19/5684 73/504.13 |

OTHER PUBLICATIONS

Senkal et al., "100K Q-Factor Toroidal Ring Gyroscope Implemented in Wafer-Level Epitaxial Silicon Encapsulation Process", Micro Electro Mechanical Systems (MEMS), IEEE, pp. 24-27, Jan. 26-30, 2014.

European Search Report and Opinion issued in connection with corresponding EP Application No. 16167402.3 dated Oct. 10, 2016.

* cited by examiner

INERTIAL SENSING SYSTEMS AND METHODS OF MANUFACTURING THE SAME

CROSS REFERENCE TO RELATED APPLICATIONS

This application is a non-provisional and claims priority to U.S. Provisional Patent Application 62/154,384 filed Apr. 29, 2015, which is hereby incorporated by reference in its entirety.

BACKGROUND

This disclosure relates generally to inertial sensing systems, and, more specifically, to inertial sensing systems that include vibratory gyroscopes co-fabricated with an accelerometer and methods of manufacturing the same.

Many known microelectromechanical systems (MEMS) provide a way to make very small mechanical structures and integrate these structures with electrical devices on a substrate using conventional batch semiconductor processing techniques. One common application of MEMS is the design and manufacture of sensor devices. Known MEMS sensor devices are widely used in applications such as automotive, inertial guidance systems, household appliances, game devices, protection systems for a variety of devices, and many other industrial, scientific, and engineering systems. One example of a MEMS sensor is a Coriolis vibratory gyroscope (CVG), which is an inertial sensor that senses angular speed or velocity around one or more axes. Another example is a MEMS accelerometer. MEMS gyroscopes and accelerometers may be used together as an inertial navigation system or inertial navigation unit, in which case accelerometers can be used to calibrate gyroscope drift.

CVGs are subdivided into Class I and Class II gyroscopes. Examples of Class I CVGs are the tuning fork gyroscope and the quadruple mass gyroscope (QMG). At least some known Class I gyroscopes include a relatively large rigid proof mass, which is beneficial for sensing, but also are susceptible to vibrations and shocks that may reduce sensing accuracy. An example of a Class II CVG is a ring gyroscope or a disc resonant gyroscope having a flexible proof mass. Class II CVGs are geometrically symmetrical about their input axis and have identical or nearly identical resonant frequencies for vibration in the drive mode and sense mode directions.

At least some known ring gyroscopes are resistant to vibrations and shocks, but may include a relatively small proof mass consisting of only a single ring, which may cause a high level of mechanical noise and reduce sensing accuracy. As used herein, the proof mass, or drive mass, is the effective mass whose inertia transforms an input angular speed along, or about, an input axis into a Coriolis force. At least some known disc resonant gyroscopes are also resistant to vibrations and shocks. However, despite generally having a larger proof mass than ring gyroscopes, only a small portion of the total proof mass oscillates when the proof mass is excited. Consequently, disc resonant gyroscopes may also suffer from a relatively high level of white noise.

BRIEF DESCRIPTION

In one aspect, a gyroscope is provided. The gyroscope includes at least one anchor and a plurality of gyroscope spring elements coupled to the at least one anchor. The gyroscope also includes a plurality of concentric rings coupled to the plurality of gyroscope spring elements and configured to substantially encircle the plurality of gyroscope spring elements. The gyroscope further includes an excitation/detection unit coupled to the plurality of concentric rings.

In another aspect, an inertial sensing system is provided. The inertial sensing system includes a substantially circular gyroscope defining a central opening and an accelerometer positioned within the central opening, wherein the accelerometer and gyroscope are co-fabricated on a substrate.

In another aspect, a method of manufacturing an inertial sensing system is provided. The inertial sensing system includes a gyroscope having an anchor, a plurality of circumferentially-spaced gyroscope spring elements, a plurality of concentric rings, and an excitation/detection unit. The method includes coupling the plurality of circumferentially-spaced spring elements to the anchor. The method also includes coupling the plurality of concentric rings to the plurality of circumferentially-spaced spring elements such that the plurality of concentric rings substantially encircles the plurality of spring elements. The excitation/detection unit is then coupled to the plurality of concentric rings.

DRAWINGS

These and other features, aspects, and advantages of the present disclosure will become better understood when the following detailed description is read with reference to the accompanying drawings in which like characters represent like parts throughout the drawings, wherein.

Figure 1:
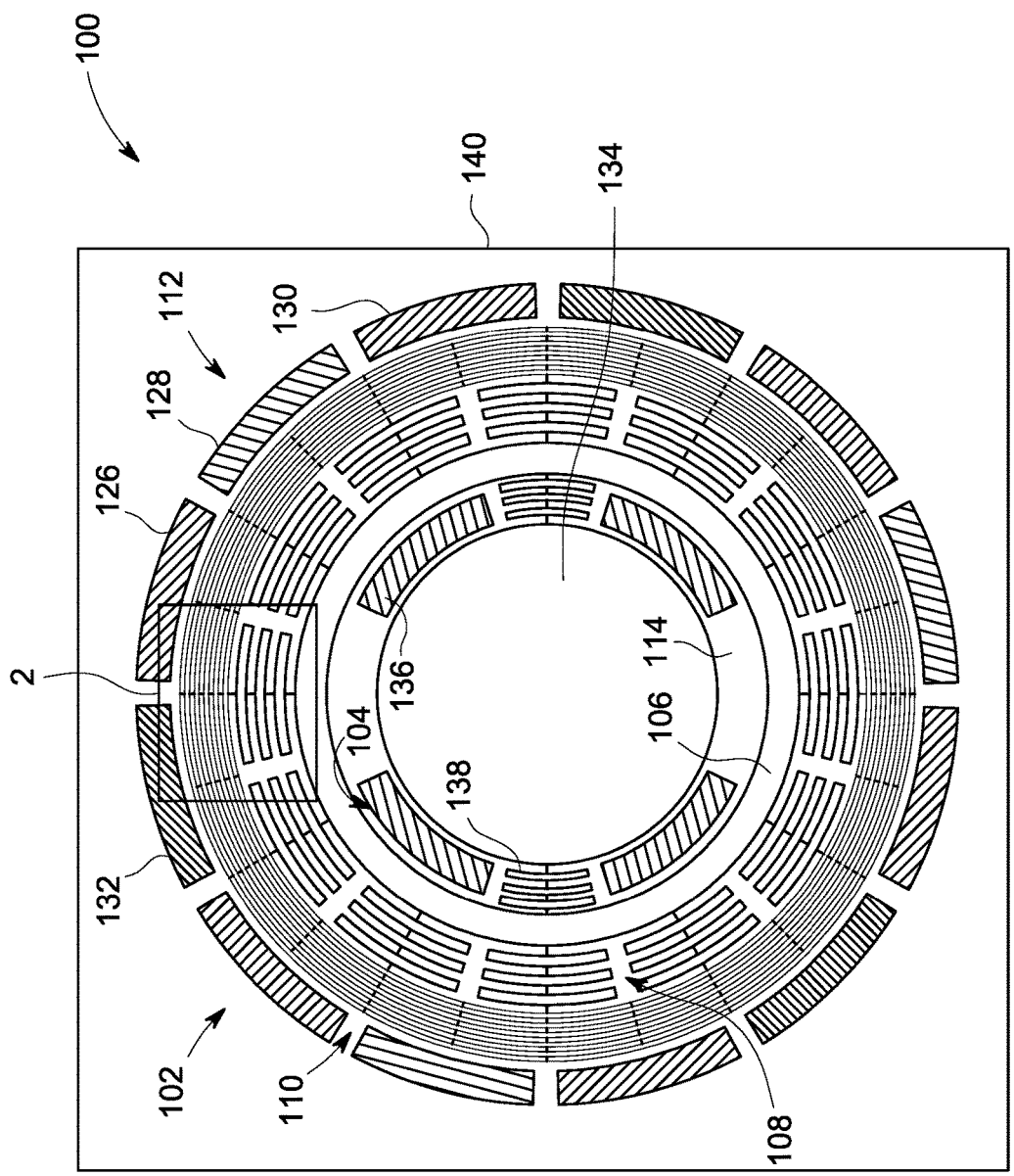
FIG. 1 is a top view of an exemplary inertial sensing system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

The inertial sensing systems described herein facilitate efficient methods of vibratory gyroscope and accelerometer operation co-fabricated as a unit. Specifically, in contrast to many known inertial sensing systems, the inertial sensing systems as described herein include a novel gyroscope and accelerometer configuration. More specifically, the inertial sensing systems described herein include a gyroscope that defines an inner opening such that the accelerometer is mounted within the opening. Such a configuration allows for a more efficient use of area on the substrate material to which the gyroscope and accelerometer are coupled.

Furthermore, the inertial sensing system described herein includes a gyroscope that includes a plurality of concentric rings as a proof mass. Specifically, rings having a greater radial length are, in one embodiment, heavier and positioned radially outward from rings having a smaller radial length. As such, the overall proof mass of the gyroscope is increased to increase sensing performance. Moreover, the varying sizes of the rings enable each ring to resonate with the same oscillating amplitude as every other ring when excited by an excitation unit. The gyroscope also includes a plurality of spring elements that each includes a plurality of spring members. The spring members have varying radial lengths similar to the rings. Additionally, the inertial sensing system includes a degree of freedom to use any number of spring elements as necessary to provide for optimal sensing performance. Specifically, the number of spring elements included in the gyroscope is optimized such that the resonant frequency of a drive axis of the gyroscope exactly matches a resonant frequency of a sense axis of the gyroscope. In an alternative embodiment, the number is spring elements in the gyroscope cause the resonant frequency of the drive axis to be different from the resonant frequency of a sense axis.

Figure 2:
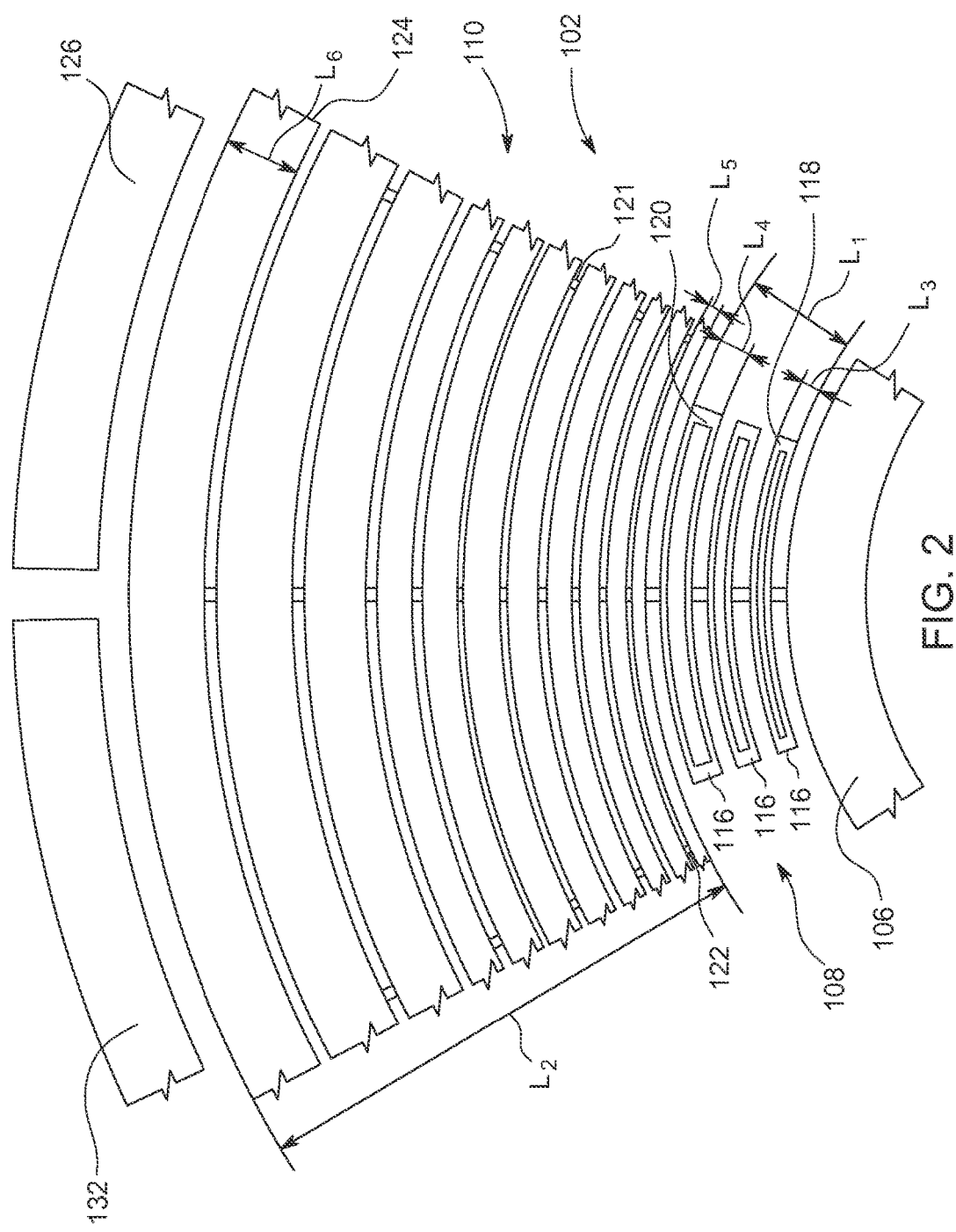
FIG. 2 is an enlarged view of a portion of the inertial sensing system taken along area 2 shown in FIG. 1.

FIG. 1 is a top view of an exemplary inertial sensing system 100, and FIG. 2 is an enlarged view of a portion of inertial sensing system 100 taken along area 2 (both shown in FIG. 1). In the exemplary embodiment, system 100 includes an axisymmetric Coriolis vibratory gyroscope 102 and an accelerometer 104. Gyroscope 102 includes an anchor 106, a plurality of gyroscope spring elements 108, a proof mass including a plurality of concentric rings 110, and an excitation/detection unit 112. In the exemplary embodiment, anchor 106 is the radially innermost component of substantially circular gyroscope 102 and defines a central opening 114 into which accelerometer 104 is positioned or located, as described in further detail below.

Figure 3:
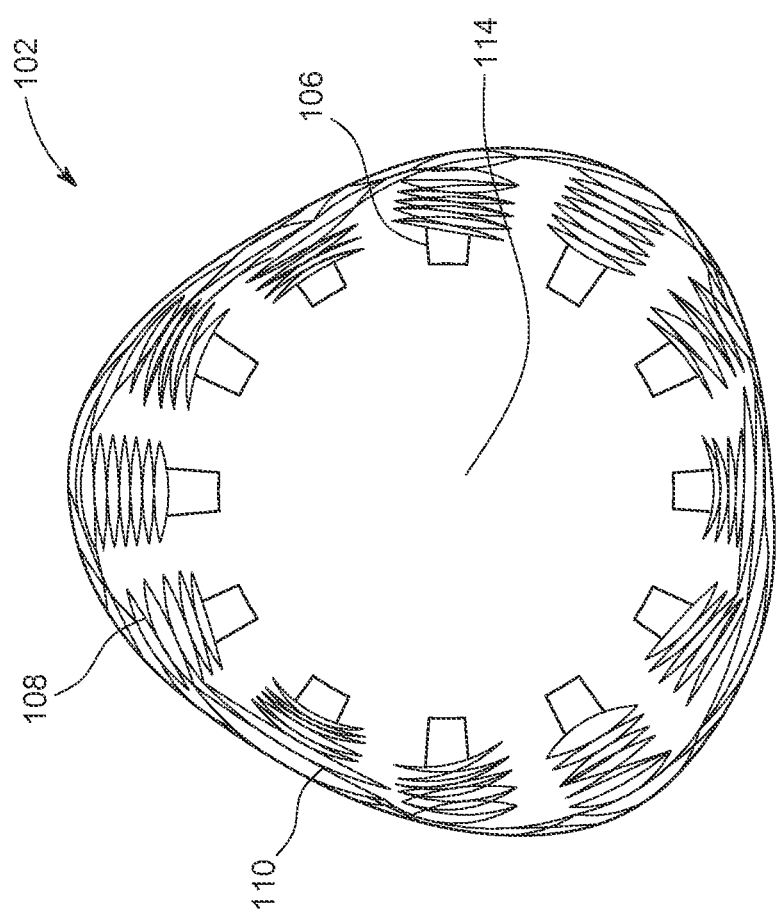
FIG. 3 is top view of the inertial sensing system during an oscillation.

In one example, the plurality of gyroscope spring elements 108 is mechanically coupled to anchor 106. More specifically, the gyroscope spring elements 108 are circumferentially-spaced about anchor 106 such that the gyroscope spring elements 108 are positioned radially outward from and substantially encircle anchor 106. As used herein, the term "encircle" is meant to describe that plurality of gyroscope spring elements 108, as a whole, substantially circumscribes anchor 106. However, because plurality of gyroscope spring elements 108 is formed from a number of separate gyroscope spring elements 108, plurality of spring elements 108 does not form a complete circle about anchor 106. More specifically, plurality of gyroscope spring elements 108 is circumferentially-spaced about anchor 106 such that adjacent gyroscope spring elements 108 are separated by a gap. As such, plurality of spring elements 108 substantially encircles anchor 106, but does not necessarily form a complete, unbroken, circle. In the exemplary embodiment, anchor 106 is a continuous substantially circular structure that forms a complete circle defining central opening 114. Alternatively, anchor 106 is formed from a plurality of circumferentially-spaced anchor elements (as shown in FIG. 3). In such a configuration, each gyroscope spring element 108 is mechanically coupled to a respective anchor element of anchor 106. Generally, each spring element 108 of the plurality of gyroscope spring elements 108 is coupled to anchor 106 in any manner that enables operation of gyroscope 102 and inertial sensing system 100 as described herein.

In the exemplary embodiment, the excitation/detection unit 112 includes a plurality of electrodes that is electrostatically coupled to the concentric rings 110. Alternatively, the excitation/detection unit 112 includes any of optical/photonic devices, magnetic devices, inductive devices, piezoresistive devices, tensoresistive devices, or any combination thereof. Generally, any known method of gyroscope excitation, detection, and tuning may be used with gyroscope 102 that enables operation as described herein.

Referring now to FIG. 2, in the exemplary embodiment, the plurality of gyroscope spring elements 108 includes an overall radial length L1 extending between anchor 106 and plurality of concentric rings 110. Similarly, plurality of rings 110 includes an overall radial length L2 extending between gyroscope spring elements 108 and excitation/detection unit 112. It is noted that some features shown in FIG. 2 are exaggerated and FIG. 2 is not drawn to scale. In one example, the radial length L1 of each gyroscope spring element 108 is greater than the radial length L2 of rings 110. Alternatively, in another suitable embodiment, radial length L1 of each gyroscope spring element 108 is less than or equal to radial length L2 of rings 110. Generally, gyroscope spring elements 108 and rings 110 have any radial length that facilitates operation of gyroscope 102 and inertial sensing system 100 as described herein.

In the exemplary embodiment, gyroscope spring elements 108 include a plurality of folded spring members 116. Spring members 116 of a respective gyroscope spring element 108 are radially offset from one another and each spring member 116 includes a different radial length such that the radial length of each spring member varies between anchor 106 and rings 110. More specifically, spring members 116 include a first spring member 118 positioned adjacent anchor 106 and having a radial length L3. Additionally, spring members 116 include a second spring member 120 positioned adjacent rings 110 and radially outward from first spring member 118. Second spring member 120 also includes a radial length L4 that is greater than radial length L3. Generally, each spring member 116 includes a radial length that is greater than a radial length of an immediately adjacent radially inner spring member 116 such that each spring member 116 includes a radial length shorter than a radial length of an immediately successive outer spring member 116.

In one embodiment, radially outward spring members 116 are larger and heavier than radially inner spring members 116 to provide a larger overall proof mass of gyroscope 102 to be sensed by excitation/detection unit 112, as described in further detail herein. As such, when gyroscope 102 is excited, gyroscope spring elements 108 vibrate with less amplitude in their respective radially inner portions proximate anchor 106 and vibrate with a greater amplitude in their radially outer portions proximate rings 110. As described herein, it is desirable that gyroscope 102 have a large proof mass and a large excitation amplitude to provide for more accurate sensing by excitation/detection unit 112 and, therefore, facilitate improving performance of gyroscope 102. Alternatively, in another suitable embodiment, each spring member 116 has a substantially similar radial length.

In the exemplary embodiment, as shown in FIG. 1, gyroscope 102 includes twelve gyroscope spring elements 108 circumferentially-spaced about anchor 106. Alternatively, gyroscope 102 includes any number of gyroscope spring elements 108, such as 11, 15, 17, or 19 gyroscope spring elements 108, that facilitate operation of inertial sensing system 100 as described herein. More specifically, the number of gyroscope spring elements 108 in gyroscope 102 is optimized such that the resonant frequency of a drive axis of gyroscope 102 exactly matches a resonant frequency of a sense axis of gyroscope 102. When the resonant frequencies of the gyroscope drive mode and the sense mode are matched, the signal-to-noise ratio is improved. Such a configuration improves the sensitivity of inertial sensing system 100 and reduces an amount of mechanical noise sensed by inertial sensing system 100.

Furthermore, because gyroscope spring elements 108 and rings 110 are separate components of gyroscope 102, inertial sensing system 100 includes a degree of freedom to use a different number of gyroscope spring elements 108 than rings 110 and is not limited to using a gyroscope with only a one-to-one spring-to-ring ratio. The number of gyroscope spring elements 108 can be optimized based on a number of factors to cause the resonant frequency matching described above. Generally, gyroscope 102 includes any number of gyroscope spring elements 108 that enable inertial sensing system 100 to operate as described herein.

In the exemplary embodiment, plurality of rings 110 serves as resonators and are positioned between and mechanically coupled to plurality of spring elements 108 and communicatively coupled to excitation/detection unit 112. Rings 110 include a plurality of radial braces 121 circumferentially-spaced between adjacent rings 110. Braces 121 are flexible to enable the gap between adjacent rings 110 to increase and decrease when gyroscope 102 is excited. Although eleven rings 110 are shown in FIG. 2, gyroscope 102 includes any number of rings 110 that facilitates operation of gyroscope 102 and inertial sensing system 100 as described herein. For example, the number of rings 110 in gyroscope 102 is within a range of between approximately 5 rings to approximately 20 rings, and, more specifically, 8 rings.

Similar to gyroscope spring elements 108, each ring 110 includes a different radial length such that the radial length of each ring 110 varies between spring elements 108 and excitation/detection unit 112. More specifically, rings 110 include a first ring 122 positioned adjacent gyroscope spring elements 108 and having a radial length L5. Additionally, rings 110 include a second ring 124 positioned adjacent excitation/detection unit 112 and radially outward from first ring 122. Second ring 124 also includes a radial length L6 that is longer than radial length L5. Generally, each ring 110 includes a radial length that is greater than a radial length of an immediately adjacent radially inner ring 110 such that each ring 110 includes a radial length shorter than a radial length of an immediately successive outer ring 110.

In the exemplary embodiment, rings 110 having a greater radial length are heavier than and positioned radially outward from rings 110 having a smaller radial length to increase the overall proof mass of gyroscope 102. As described herein, it is desirable that gyroscope 102 have a large proof mass and a large amplitude to provide for more accurate sensing by excitation/detection unit 112 and, therefore, a better performing gyroscope 102. Alternatively, in another suitable embodiment, each ring 110 has a substantially similar radial length. Generally, the radial lengths of rings 110 are optimized such that each ring 110 has a substantially similar amplitude, which maximizes excitation/detection unit 112 sensing and provides for a higher quality gyroscope 102. As such, in the exemplary embodiment, the varying sizes of rings 110 enable each ring 110 to have the same oscillating amplitude when excited by at least one electrode of the excitation/detection unit 112. Furthermore, plurality of rings 110 includes a rigidity that is greater than a rigidity of spring elements 108.

As shown in FIGS. 1 and 2, excitation/detection unit 112 includes electrodes that are circumferentially-spaced about rings 110 such that electrodes substantially encircle rings 110. Similar to gyroscope spring elements 108 as described above, the term "encircle" is meant to describe that plurality of electrodes, as a whole, substantially circumscribes rings 110. However, because excitation/detection unit 112 is formed from a number of separate electrodes, excitation/detection unit 112 does not form a complete circle about rings 110. More specifically, the plurality of electrodes is circumferentially-spaced about rings 110 such that adjacent electrodes are separated by a gap. As such, plurality of electrodes substantially encircles rings 110, but does not necessarily form a complete, unbroken, circle. In the exemplary embodiment, excitation/detection unit electrodes 112 include at least one excitation electrode 126 for exciting rings 110, at least one detection electrode 128 for measuring an amplitude of rings 110 during excitation, and at least one electrode 130 for quadrature compensating. Gyroscope 102 may also include at least one feedback electrode 132, called force-rebalance electrode, which increases a bandwidth of the signals. In general, an alternating voltage (AC), or a combination of AC and direct voltage (DC), is applied to excitation electrode 126 to cause rings 110 to oscillate about a drive axis. As rings 110 oscillate, rings 110 cause the capacitance of detection electrode 128 to change. A drive circuit (not shown) monitors the capacitance of detection electrode 128 to ascertain the oscillation amplitude of rings 110. By monitoring the capacitance of detection electrodes 128, rings 110 can be suitably controlled to maintain relatively constant oscillation amplitude for a respective mode of operation of gyroscope 102.

FIG. 3 illustrates gyroscope 102 excited into resonance mode wine-glass #3. Although gyroscope 102 is shown as resonating in wine-glass #3, gyroscope 102 can be operated to resonate in any resonance of wine-glass #2-#5. Additionally, gyroscope 102 is not limited to wine-glass resonance shape, but may be excited into any resonance shape that facilitates operation of gyroscope 102 as described herein. Furthermore, gyroscope 102 may operate in any known mode of operation, such as, but not limited to, force-rebalance mode, whole-angle mode, and frequency modulated mode. Rings 110 then oscillate based on the excitation mode and gyroscope spring elements 108 are compressed and/or stretched based on the operating mode. More specifically, one spring member 116 of a spring element 108 may compress and another spring member 116 of the same spring element 106 may stretch. Generally, gyroscope spring elements 108 compress and/or stretch to accommodate the shape of rings 110 as determined by the gyroscope operating mode.

Referring again to FIG. 1, inertial sensing system 100 includes accelerometer 104 positioned within opening 114 formed by anchor 106 of gyroscope 102. In the exemplary embodiment, accelerometer 104 includes a central body portion 134, a plurality of accelerometer electrodes 136, and a plurality of accelerometer spring elements 138. Similar to excitation/detection unit 112 of gyroscope 102, accelerometer electrodes 136 are circumferentially-spaced about body portion 134 such that accelerometer electrodes 136 substantially encircle body portion 134. As such, accelerometer electrodes 136 are positioned between body portion 134 of accelerometer 104 and anchor 106 of gyroscope 102. Additionally, in the exemplary embodiment, accelerometer spring elements 138 include two spring elements 138 oriented opposite each other with respect to body portion 134 such that accelerometer spring elements 138 are mechanically coupled between body portion 134 and anchor 106 of gyroscope 102.

Furthermore, inertial sensing system 100 includes a substrate 140 configured to support both gyroscope 102 and accelerometer 104. Substrate 140 may be manufactured using any known MEMS processes and materials, and gyroscope 102 and accelerometer 104 are micromachined on substrate 140. For example, substrate 140 and/or portions of at least one of gyroscope 102 and accelerometer 104 may be constructed from silicon and/or quartz. That is, portions of gyroscope 102 and accelerometer 104 are co-fabricated on substrate 140 using a known etching process with accelerometer 104 being positioned within central opening 114 of gyroscope 102. As such, gyroscope 102 and accelerometer 104 are mechanically anchored to substrate 140, but may not be mechanically or electrically connected to each other.

Positioning accelerometer 104 within opening 114 enables a more efficient use of substrate 140 area rather than positioning an accelerometer adjacent the gyroscope, as in conventional inertial sensing systems. As such, positioning accelerometer 104 within opening 114 enables a smaller size substrate 140 in inertial sensing system 100 to provide the same system performance as with system having adjacent gyroscopes and accelerometers. Alternatively, within the same substrate area as known inertial sensing systems, the increased proof mass and condensed configuration of inertial sensing system 100 described herein provides for increased system performance. Furthermore, co-fabricating gyroscope 102 and accelerometer 104 on substrate 140 aligns the sensitivity of gyroscope 102 and accelerometer 104 and provides temperature and vibration stability. As a result, gyroscope 102 is calibrated using a signal from accelerometer 104, or alternatively, accelerometer 104 is calibrated using a signal from gyroscope 102. Additionally, co-locating gyroscope 102 and accelerometer 104 provides a stress reduction means that results in an increased system performance and cross-calibration where accelerometer calibrates gyroscope signal.

The above described inertial sensing systems facilitate efficient methods of vibratory gyroscope and accelerometer operation. Specifically, in contrast to many known inertial sensing systems, the inertial sensing systems as described herein include a novel gyroscope and accelerometer configuration. More specifically, the inertial sensing systems described herein include a gyroscope that defines an inner opening such that the accelerometer is mounted within the opening. Such a configuration allows for a more efficient use of area on the substrate material to which the gyroscope and accelerometer are coupled. The novel configuration enables a smaller substrate material to provide a substantially similar performance of some known sensing systems. As such, the package that houses the inertial sensing system may be used in smaller applications without sacrificing performance and also costs less to produce. Additionally, the novel configuration enables additional proof mass to be added to the gyroscope to increase the sensing performance of the inertial sensing system while maintaining the same overall package size.

Furthermore, the inertial sensing system described herein includes a gyroscope that includes a plurality of concentric rings. Specifically, each ring includes a radial length that is greater than a radial length of an immediately adjacent radially inner ring. Rings having a greater radial length are, in one embodiment, heavier than rings having a smaller radial length to increase the overall proof mass of the gyroscope to increase sensing performance. Moreover, the varying sizes of the rings enable each ring to have the same oscillating amplitude as every other ring when excited by the excitation/detection unit. The gyroscope also includes a plurality of spring elements that each include a plurality of spring members. The spring members have varying radial lengths similar to the rings. Additionally, the inertial sensing system includes a degree of freedom to use any number of spring elements as necessary to provide for optimal sensing performance Specifically, the number of spring elements included in the gyroscope is optimized such that the resonant frequency of a drive axis of the gyroscope exactly matches a resonant frequency of a sense axis.

An exemplary technical effect of the methods, systems, and apparatus described herein includes at least one of: (a) increasing the sensing performance of the inertial sensing system by varying the size of each of the concentric rings that provide the proof mass and optimizing the number of spring elements; and (b) reducing the manufacturing costs of the inertial sensing system positioning the accelerometer within the gyroscope to enable use of a smaller substrate.

Exemplary embodiments of methods, systems, and apparatus for manufacturing an inertial sensing system are not limited to the specific embodiments described herein, but rather, components of systems and steps of the methods may be utilized independently and separately from other components and steps described herein. For example, the methods may also be used in combination with other sensing system, and are not limited to practice with only the inertial sensing system and methods as described herein. Rather, the exemplary embodiment can be implemented and utilized in connection with many other applications, equipment, and systems that may benefit from the advantages described herein.

Although specific features of various embodiments of the disclosure may be shown in some drawings and not in others, this is for convenience only. In accordance with the principles of the disclosure, any feature of a drawing may be referenced and claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. An inertial sensing system, comprising:
a substrate;
a gyroscope mechanically coupled to the substrate by an anchor, wherein the gyroscope is circular in shape and defines a central opening, and wherein the gyroscope comprises:

a plurality of gyroscope spring elements coupled to the anchor;

a gyroscope proof mass, wherein the gyroscope proof mass comprises a plurality of concentric rings operatively coupled to the plurality of gyroscope spring elements, and wherein the gyroscope proof mass encircles the plurality of gyroscope spring elements;

a plurality of gyroscope electrodes to sense an angular rate of the gyroscope proof mass;

an accelerometer positioned within the central opening, wherein the accelerometer comprises:

a plurality of accelerometer spring elements;

an accelerometer body portion coupled to the substrate through the plurality of accelerometer spring elements and not through the gyroscope proof mass; and a plurality of accelerometer electrodes to sense an acceleration of the accelerometer body portion, wherein the gyroscope and the accelerometer are configured to be independently operable.

2. The inertial sensing system in accordance with claim 1, wherein the plurality of accelerometer electrodes encircles the accelerometer body portion, and wherein the plurality of accelerometer electrodes is positioned between the accelerometer body portion and the gyroscope.

3. The inertial sensing system in accordance with claim 1, wherein the gyroscope comprises:

an excitation/detection unit coupled to the plurality of concentric rings.

4. The inertial sensing system in accordance with claim 3, wherein the plurality of concentric rings encircles the anchor.

5. The inertial sensing system in accordance with claim 1, wherein the anchor defines the central opening.

6. The inertial sensing system in accordance with claim 1, wherein the plurality of gyroscope spring elements is circumferentially-spaced about the anchor.

7. The inertial sensing system in accordance with claim 1, wherein the gyroscope is configured to sense angular speed, the accelerometer is configured to sense acceleration, and wherein the inertial sensing system is configured to sense acceleration without operation of the gyroscope.

8. The inertial sensing system in accordance with claim 1, wherein the accelerometer body portion is coupled to the anchor through the plurality of accelerometer spring elements and not through the gyroscope proof mass.

* * * * *